US007742648B2

(12) United States Patent
Sato et al.

(10) Patent No.: US 7,742,648 B2
(45) Date of Patent: Jun. 22, 2010

(54) IMAGE INFORMATION ENCODING APPARATUS AND IMAGE INFORMATION ENCODING METHOD FOR MOTION PREDICTION AND/OR COMPENSATION OF IMAGES

(75) Inventors: Kazushi Sato, Chiba (JP); Teruhiko Suzuki, Chiba (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1455 days.

(21) Appl. No.: 10/501,714

(22) PCT Filed: Jan. 23, 2003

(86) PCT No.: PCT/JP03/00606

§ 371 (c)(1),
(2), (4) Date: Mar. 2, 2005

(87) PCT Pub. No.: WO03/067896

PCT Pub. Date: Aug. 14, 2003

(65) Prior Publication Data

US 2005/0157936 A1    Jul. 21, 2005

(30) Foreign Application Priority Data

Jan. 23, 2002    (JP)    ............................. 2002-014888

(51) Int. Cl.
*G06K 9/36*    (2006.01)
(52) U.S. Cl. ...................................... 382/239; 382/232
(58) Field of Classification Search ................ 382/232, 382/239, 253; 348/404.1; 358/426.02
See application file for complete search history.

(56) References Cited

U.S. PATENT DOCUMENTS 6,590,902 B1 *   7/2003  Suzuki et al. ............... 370/465
2001/0010706 A1 *  8/2001  Sato et al. .............. 375/240.12

FOREIGN PATENT DOCUMENTS

JP    9-322175    12/1997

(Continued)

OTHER PUBLICATIONS

Wedi, Thomas, "Adaptive Interpolation Filter for H.26L," ITU Study Group 16 Question 6, Video Coding Experts Group (VCEG), Sep. 24, 2001, pp. 1-7, XP002398691.

(Continued)

*Primary Examiner*—Brian Q Le
*Assistant Examiner*—Edward Park
(74) *Attorney, Agent, or Firm*—Oblon, Spivak, McClelland, Maier & Neustadt, L.L.P.

(57) ABSTRACT

The present invention is directed to an image information encoding apparatus (10) used, in receiving compressed image information through network media, when processing of such compressed image information is performed on storage media. A picture sorting buffer (12) delivers information of picture type of frame Picture_type to a picture type discrimination unit (22). The picture type discrimination unit (22) transmits command to a motion prediction/compensation unit (21) on the basis of that information. The motion prediction/compensation unit (21) generates predictive picture by using filter coefficients having the number of taps lesser than that of P picture with respect to B picture for which operation quantity and the number of memory accesses are required to more degree as compared to, e.g., P picture on the basis of that command.

17 Claims, 10 Drawing Sheets

FOREIGN PATENT DOCUMENTS

| | | |
|---|---|---|
| JP | 11-262012 | 9/1999 |
| JP | 11-275591 | 10/1999 |
| JP | 2001-189934 | 7/2001 |

OTHER PUBLICATIONS

Bjontegaard, Gisle, "H.26L Test Model Long Term Number 8 (TML-8) draft0," Video Standard and Drafts, ITU Q.6/SG16, VCEG-N10, Sep. 20, 2001, pp. 1-46, XP002518166.

Wedi, Thomas, "Adaptive Interpolation Filter for Motion Compensation Hybrid Video Coding," Proceedings of the Picture Coding Symposium, Apr. 25, 2001, pp. 49-52, XP008068898.

Sato, Kazushi, "Adaptive MC Interpolation Filter for Complexity Reduction," Joint Video Team (JVT) of ISO/IEC MPEG and ITU-T VCEG(ISO/IEC JTC1/SC29/WG11 and ITU SG16 Q6), No. JVT-C05r1-L, May 10, 2002, XP030005161.

Sato, Kazushi, "Adaptive MC Interpolation for Complexity Reduction," Joint Video Team (JVT) of ISO/IEC MPEG and ITU-T VCEG(ISO/IEC JTC1/SC29/WG11 and ITU-T SG16 Q6), Jul. 26, 2002, XP030005354.

* cited by examiner

FIG. 1

| Code Number | PTYPE(Picture Type) |
|---|---|
| 0 | P PICTURE (ONLY PICTURE IMMEDIATELY BEFORE IS USED FOR PREDICTION) |
| 1 | P PICTURE (PLURAL PAST PICTURES ARE USED FOR PREDICTION; PREDICTIVE FRAMES WITH RESPECT TO PERSPECTIVE MACRO BLOCKS ARE ENCODED INTO IMAGE COMPRESSED INFORMATION) |
| 2 | I PICTURE |
| 3 | B PICTURE (ONLY PICTURES IMMEDIATELT BEFORE AND IMMEDIATELY AFTER ARE USED FOR PREDICTION) |
| 4 | B PICTURE (PLURAL PAST AND FUTURE PICTURES ARE USED FOR PREDICTION; PREDICTIVE FRAMES WITH RESPECT TO PERSPECTIVE MACRO BLOCKS ARE ENCODED INTO IMAGE COMPRESSION INFORMATION) |

FIG.4

| Code_number | Prediction Type | Intra_pred_mode | Ref_frame | Blk_size | MVDFW | MVDBW |
|---|---|---|---|---|---|---|
| 0 | Direct | | | | | |
| 1 | Forward_16x16 | | x | | x | |
| 2 | Backward_16x16 | | | | | x |
| 3 | Bi-directional | | x | x | x | x |
| 4 | Forward_16x8 | | x | | x | |
| 5 | Backward_16x8 | | | | | x |
| 6 | Forward_8x16 | | x | | x | |
| 7 | Backward_8x16 | | | | | x |
| 8 | Forward_8x8 | | x | | x | |
| 9 | Backward_8x8 | | | | | x |
| 10 | Forward_8x4 | | x | | x | |
| 11 | Backward_8x4 | | | | | x |
| 12 | Forward_4x8 | | x | | x | |
| 13 | Backward_4x8 | | | | | x |
| 14 | Forward_4x4 | | x | | x | |
| 15 | Backward_4x4 | | | | | x |
| 16 | Intra_4x4 | x | | | | |
| 17 | Intra_16x16 | | | | | |

FIG.5

| Code_number | Block Size |
|---|---|
| 0 | 1  16x16 block |
| 1 | 4  8x8 blocks |
| 2 | 2  16x8 blocks |
| 3 | 2  8x16 blocks |
| 4 | 2  8x4 blocks |
| 5 | 8  4x8 blocks |
| 6 | 16  4x4 blocks |

FIG.6

IMAGE INFORMATION ENCODING APPARATUS AND IMAGE INFORMATION ENCODING METHOD FOR MOTION PREDICTION AND/OR COMPENSATION OF IMAGES

TECHNICAL FIELD

The present invention relates to an image information encoding apparatus and a method therefor, an image information decoding apparatus and a method therefor, and a program which are used in receiving, through network media such as satellite broadcast, cable TV and/or Internet, etc., or in processing on storage media such as optical disc, magnetic disc or flash memory, etc. compressed image information (bit stream) by orthogonal transform such as discrete transform or Karnen-Loeve transform, etc. and motion compensation like MPEG (Moving Picture Experts Group), H.26x, This Application claims priority of Japanese Patent Application No. 2002-014888, filed on Jan. 23, 2002, the entirety of which is incorporated by reference herein.

BACKGROUND ART

In recent years, apparatuses in conformity with the system such as MPEG in which image information is handled as digital information to compress, in that instance, image information by orthogonal transform such as discrete cosine transform, etc. and motion compensation by making use of redundancy specific to image information for the purpose of performing transmission and/or storage of efficient information are being popularized in both information distribution (delivery) at broadcast station, etc. and information reception in general homes.

Particularly, MPEG 2 (ISO/IEC 13818-2) is defined as general purpose image encoding system, and is widely used at present for broad applications of professional use purpose and consumer use purpose at the standard where both interlaced scanning image and sequential scanning image, and standard resolution image and high definition image are covered or included. By using the MPEG 2 compression system, e.g., in the case of interlaced scanning image of standard resolution having 720×480 pixels, code quantity (bit rate) of 4 to 8 M bps is assigned, and in the case of interlaced scanning image of high resolution having 1920×1088 pixels, code quantity (bit rate) of 18 to 22 M bps is assigned so that high compression factor and satisfactory picture quality can be realized.

The MPEG 2 was mainly directed to high picture quality encoding adapted for broadcast, but did not comply with code quantity (bit rate) lower than the MPEG 1, i.e., encoding system of higher compression factor. However, it is expected that need of such encoding system will be increased in future by popularization of portable terminals. In correspondence therewith, standardization of the MPEG 4 encoding system was performed. In regard to the image encoding system, the standard thereof was approved for the International standard as ISO/IEC 14496-2 in December, 1998.

Further, in recent years, for the first object of image encoding for television conference, the standardization of H. 26L (ITU-T Q6/16 VCEG) is being developed. At H.26L, it is known that while a larger number of operation quantities are required in encoding/decoding therefor as compared to the conventional encoding system of the MPEG 2 or MPEG 4, higher encoding efficiency can be realized. Moreover, at present, as a part of activity of MPEG 4, standardization in which functions which cannot be supported by the H.26L are also taken in with such H.26L being as base is being performed as Joint Model of Enhanced-Compression Video Coding.

Meanwhile, in the H.26L, as one of element technology for realizing high encoding efficiency, motion prediction/compensation based on variable block is mentioned. Under existing circumstances, seven kinds of prediction/compensation block sizes as shown in FIG. 1 are determined.

Moreover, in the H.26L, motion prediction/compensation processing of high accuracy such as ¼ pixel accuracy or ⅛ pixel accuracy are prescribed. In the following description, motion prediction/compensation processing will be first described.

The motion prediction/compensation processing of ¼ pixel accuracy determined in the H.26L is shown in FIG. 2. In generating predictive picture of ¼ pixel accuracy, FIR filters respectively having 6 taps in horizontal and vertical directions are first used to generate pixel values of ½ pixel accuracy on the basis of pixel values stored in the frame memory. Here, as coefficients of the FIR filter, coefficients indicated by the following formula (1) are determined.

$$\{1,-5,20,20,-5,1\}/32 \qquad (1)$$

Further, predictive picture of ¼ pixel accuracy is generated by linear interpolation on the basis of the generated predictive picture of ½ pixel accuracy.

Further, at the H.26L, for the purpose of performing motion prediction/compensation of ⅛ pixel accuracy, filter banks shown in the following formula (2) are prescribed.

$$\begin{aligned}&1: 1 \qquad (2)\\&1/8: \{-3, 12, -37, 485, 71, -21, 6, -1\}/512\\&2/8: \{-3, 12, -37, 229, 71, -21, 6, -1\}/256\\&3/8: \{-6, 24, -76, 387, 229, -60, 18, -4\}/512\\&4/8: \{-3, 12, -39, 158, 158, -39, 12, -3\}/256\\&5/8: \{-4, 18, -60, 229, 387, -76, 24, -6\}/512\\&6/8: \{-1, 6, -21, 71, 229, -37, 12, -3\}/256\\&7/8: \{-1, 6, -21, 71, 485, -37, 12, -3\}/512\end{aligned}$$

It is to be noted that, in the image compressed information, accuracy of motion vector is prescribed by MotionRelation field in RTP (Real-time Transfer Protocol).

As stated above, in the existing H.26L, motion prediction/compensation processing using a filter determined in advance as shown in the formula (1) or (2) is prescribed. In addition, as described in "Adaptive Interpolation Filter for Motion Compensated Hybrid Video Coding" T. Wedi, Picture Coding Symposium 2001, pp 49-52 (hereinafter referred to as literature 1), it is also being considered at present to use adaptive filter corresponding to input image is used.

In concrete terms, in the literature 1, adaptive optimization for motion prediction compensation processing as described below is proposed. Namely, initially, as the first step, a filter determined in advance is used to determine motion vector d(k) which minimizes predictive error. Subsequently, as the second step, filter coefficients H(k) such that predictive error is minimized with respect to the motion vector d(k) determined at the first step are determined. By the filter coefficients H(k) and the motion vector d(k) which have been determined in this way, motion compensation processing is performed. In accordance with the literature 1, in the simulation experiment using test sequence "Mobile2 and "Foreman" of CIF size, encoding gain of the order of 1.0 to 1.5 dB can be obtained by the above-mentioned technique as compared to the case where filter determined in advance is used.

Here, in the H.26L, similarly to the MPEG 2, prescription relating to B picture is included. A method for bi-directional prediction using B picture in the H.26L is shown in FIG. 3. As shown in FIG. 3, $B_2$ picture and $B_3$ picture use $I_1$ picture and $P_4$ picture as reference picture, and $B_5$ picture and $B_6$ picture use $P_4$ picture and $P_7$ picture as reference picture.

Moreover, in the image compressed information, uses of respective pictures are prescribed as shown in FIG. 4 by PTYPE in the picture header. As shown in FIG. 4, when value of Code number is 0 or 1, use of P picture is designated. When value of Code number is 2, use of I picture is designated. When value of Code number is 3 or 4, use of B picture is designated. In this instance, when value of Code number is 0, only picture immediately before is used for prediction, whereas when value of Code number is 1, plural past pictures are used for prediction. Further, when value of Code number is 3, pictures immediately before and immediately after are used for prediction, whereas when value of Code number is 4, plural past and future pictures are used for prediction. As stated above, similarly to the P picture, also in the B picture, multiple frame prediction can be used.

Further, in the H.26L, B picture is used to thereby permit realization of time scalability. Namely, since there is no possibility that B picture is used as reference range, B picture can be annulled without performing its decoding processing.

Furthermore, in the B picture, five kinds of predictive modes of direct predictive mode, Forward predictive mode, Backward predictive mode, Bi-directional predictive mode and intra predictive mode are prescribed. It is to be noted that while the direct predictive mode and the bi-directional predictive mode are both bi-directional prediction, difference therebetween is that different motion vector information are used in the forward direction and in the backward direction in the bi-directional predictive mode, whereas motion vector information of the direct predictive mode is read out from corresponding macro block in the future predictive frame.

Macro block type (MB_Type) with respect to B picture prescribed in the H.26L is shown in FIG. 5. Here, in FIG. 5, Forward of columns of respective Prediction Types corresponding to Code_number indicates type of forward direction, Backward thereof indicates type of backward direction, Bi-directional thereof indicates type of bi-direction, and intra thereof indicates type within picture (frame), and the description such as "16x16" succeeding thereto indicates size of prediction block as shown in FIG. 1. Moreover, information to which "X" is attached of respective columns of intra_pred_mode, Ref_frame, Blk_size, MVDFW and MVDBW are defined with respect to corresponding Prediction Types. For example, MVDFW and MVDBW respectively indicate forward motion vector information and backward motion vector information. In addition, with respect to information of field block size Blk_size in the Bi-directional mode, the relationship between Code_number and Block Size as shown in FIG. 6 is prescribed.

However, in a manner as shown in FIG. 3, in the B picture, bi-directional prediction is used to thereby realize higher encoding efficiency as compared to I/P pictures, but a larger number of operation quantities and memory accesses are required as compared to the I/P pictures.

Particularly, in the case where the H.26L system is used, since interpolation processing using filter of 6 taps or 8 taps as indicated by the formula (1) or (2) is performed in prediction/compensation processing, there was the problem that its operation quantity and the number of memory accesses becomes vast as compared to the case where the MPEG 2 system is used.

DISCLOSURE OF THE INVENTION

The present invention has been proposed in view of conventional actual circumstances as described above, and its object is to provide an image information encoding apparatus a method therefor, an image information decoding apparatus and a method therefor, and a program which are adapted for reducing operation quantity and the number of memory accesses in motion prediction/compensation processing with respect to B picture.

The image information encoding apparatus according to the present invention is directed to an image information encoding apparatus adapted for encoding an input image signal at least including intraframe encoding image, interframe forward prediction encoding image and interframe bi-directional encoding image by orthogonal transform and motion prediction/compression processing in which plural different pixel accuracies can be selected to generate image compressed information, the image information encoding apparatus comprising motion/predition compensation means for performing motion prediction/compression processing based on different interpolation methods with respect to interframe forward prediction encoding image and interframe bi-directional prediction encoding image.

Here, the motion prediction compensation means selects, as an interpolation method with respect to interframe bi-directional prediction encoding image, a method in which operation quantity and the number of memory accesses are reduced as compared to the interframe forward prediction encoding image.

The image information encoding apparatus according to the present invention further comprises picture type discrimination means for discriminating picture type of an input image signal, wherein the picture type discrimination means transmits, to motion prediction/compensation means, command corresponding to interframe forward encoding image or interframe bi-directional predictive encoding image in accordance with discrimination result of picture type to control the command.

Such image information encoding apparatus discriminates picture type of an input image signal to perform, with respect to interframe bi-directional prediction encode image, motion prediction/compensation processing based on an interpolation method in which operation quantity and the number of memory accesses are reduced to more degree as compared to interframe forward prediction image to thereby reduce operation quantity and the number of memory accesses in motion prediction/compensation processing.

The image information encoding method according to the present invention is directed to an image information encoding method of encoding an input image signals at least including intraframe encoding image, interframe forward prediction encoding image and interframe bi-directional prediction encoding image by orthogonal transform and motion prediction/compensation processing in which plural different pixel accuracies can be selected to generate image compressed information, the image information encoding method including a motion prediction/compensation step of performing motion prediction/compensation processing based on different interpolation methods with respect to interframe forward prediction encoding image and interframe bi-direction prediction encoding image.

Here, at the motion prediction/compensation step, as an interpolation method with respect to interframe bi-directional prediction encoding image, there is selected a method in which operation quantity and the number of memory accesses are reduced to more degree as compared to interframe forward prediction encoding image.

The image information encoding method according to the present invention further includes a picture type discrimination step of discriminating picture type of an input image signal, wherein, at the picture type discrimination step, transmission of command corresponding to interframe forward prediction encoding image or interframe bi-directional prediction encoding image is performed in accordance with discrimination result of picture type so that processing at the motion prediction/compensation step is controlled.

In such image information encoding method, picture type of input image signal is discriminated so that motion prediction/compensation processing based on interpolation method in which operation quantity and the number of memory accesses are reduced to more degree as compared to interframe forward prediction encoding image is performed with respect to interframe bi-directional predictive encoding image so that operation quantity and the number of memory accesses are reduced in motion prediction/compensation processing.

The program according to the present invention is directed to a program for allowing computer to execute processing which encodes an input image signal at least including intraframe encoding image, interframe forward prediction encoding image and interframe bi-directional prediction encoding image by orthogonal transform and motion prediction/compensation processing in which plural different pixel accuracies can be selected to generate image compressed information, the program including a motion prediction/compensation processing based on different interpolation methods with respect to interframe forward prediction encode imaging and interframe bi-directional prediction encoding image.

Here, at the motion prediction compensation step, as an interpolation method with respect to interframe bi-directional prediction encoding image, there is selected a method in which operation quantity and the number of memory accesses are reduced to more degree as compared to interframe forward prediction encoding image.

The program according to the present invention further includes a picture type discrimination step of discriminating picture type of an input image signal, wherein, at the picture type discrimination step, transmission of command corresponding to interframe forward prediction encoding image or interframe bi-directional prediction encoding image is performed in accordance with discrimination result of picture type so that processing at motion prediction/compensation step is controlled.

Such a program allows computer to discriminate picture type of an input image signal to perform prediction/compensation processing based on an interpolation method in which operation quantity and the number of memory accesses are reduced to more degree as compared to interframe forward predictive encoding image to thereby reduce operation quantity and the number of memory accesses in motion prediction/compensation processing.

The image information decoding apparatus according to the present invention is directed to an image information decoding apparatus adapted for decoding image compressed information at least including intraframe encoding image, interframe forward prediction encoding image and interframe bi-directional prediction encoding which have been generated at an image information encoding apparatus by inverse orthogonal transform and motion prediction/compensation processing in which plural different pixel accuracies can be selected, the image information decoding apparatus comprising motion prediction/compensation means for performing motion prediction/compensation processing based on different interpolation methods with respect to interframe forward prediction encoding image and interframe bi-directional prediction encoding image.

Here, the motion prediction/compensation means selects, as an interpolation method with respect to interframe bi-directional prediction encoding image, a method in which operation quantity and the number of memory accesses are reduced to more degree as compared to interframe forward prediction encoding image.

The image information decoding apparatus according to the present invention further comprises picture type discrimination means for discriminating picture type of image compressed information, wherein the picture type discrimination means performs transmission of interframe forward prediction encoding image or interframe bi-directional prediction encode imaging in accordance with discrimination result of the picture type to control the command.

Such an image information decoding apparatus discriminates picture type of image compressed information generated in an image information encoding apparatus to perform motion prediction/compression processing based on an interpolation method in which operation quantity and the number of memory accesses can be reduced to more degree as compared to interframe forward prediction encoding image to thereby reduce operation quantity and the number of memory accesses in motion prediction/compression processing.

The image information decoding method according to the present invention is directed to an image information decoding method of decoding image compressed information at least including intraframe encoding image, interframe forward prediction encoding image and interframe bi-directional prediction encoding image by inverse orthogonal transform and motion prediction/compensation processing in which plural different pixel accuracies can be selected, the image information decoding method including motion prediction/compensation step of performing motion prediction/compensation processing based on different interpolation methods with respect to interframe forward prediction encoding image and interframe bi-directional prediction encoding image.

Here, at the motion prediction/compensation step, as an interpolation method with respect to interframe bi-directional prediction encoding image, there is selected a method in which operation quantity and the number of memory accesses are reduced to more degree as compared to interframe forward prediction encoding image.

The image information decoding method according to the present invention further includes a picture type discrimination step of discriminating picture type of image compressed information, wherein, at the picture type discrimination step, transmission of command corresponding to interframe forward predictive encoding image or interframe bi-directional prediction encode imaging is performed in accordance with discrimination result of the picture type so that processing at the motion/compression is controlled.

In such image information decoding method, picture type of image compressed information generated at the image information encoding apparatus is discriminated, and motion prediction/compensation processing based on an interpolation method in which operation quantity and the number of memory accesses are reduced to more degree as compared to the interframe forward prediction encoding image so that operation quantity and the number of memory accesses in motion prediction/compensation processing are reduced.

The program according to the present invention is directed to a program for allowing computer to execute processing which decodes image compressed information at least including intraframe encoding image, interframe forward prediction encoding image and interframe bi-directional prediction encoding image which have been generated at an image information encoding apparatus by inverse-orthogonal transform and motion prediction/compensation processing in which plural different pixel accuracies can be selected, the program including a motion prediction/compression step of performing motion prediction/compression processing based on different interpolation methods with respect to interframe forward predictive encode image and interframe bi-directional predictive encoding image.

Here, at the motion prediction compression step, as an interpolation method with respect to interframe bi-directional predictive encoding image, there is selected a method in which operation quantity and the number of memory accesses are reduced to more degree as compared to interframe forward predictive encoding image.

The program according to the present invention includes a picture type discrimination step of discriminating picture type of image compressed information, wherein, at the picture discrimination step, transmission of command corresponding to interframe forward predictive encoding image or interframe bi-directional predictive encoding image is performed in accordance with discrimination result of picture type so that processing at the motion prediction/compensation step is controlled.

Such program allows computer to discriminate picture type of image compressed information generated at the image information encoding apparatus to perform motion prediction/compensation processing based on interpolation method in which operation quantity and the number of memory accesses are reduced to more degree as compared to interframe forward predictive encoding image with respect to interframe bi-directional predictive encoding image to thereby reduce operation quantity and the number of memory accesses in the motion prediction/compensation processing.

Still more further objects of the present invention and practical merits obtained by the present invention will become more apparent from the description of the embodiments which will be given below with reference to the attached drawings.

BRIEF DESCRIPTION OF THE DRAWINGS

Figure 1:
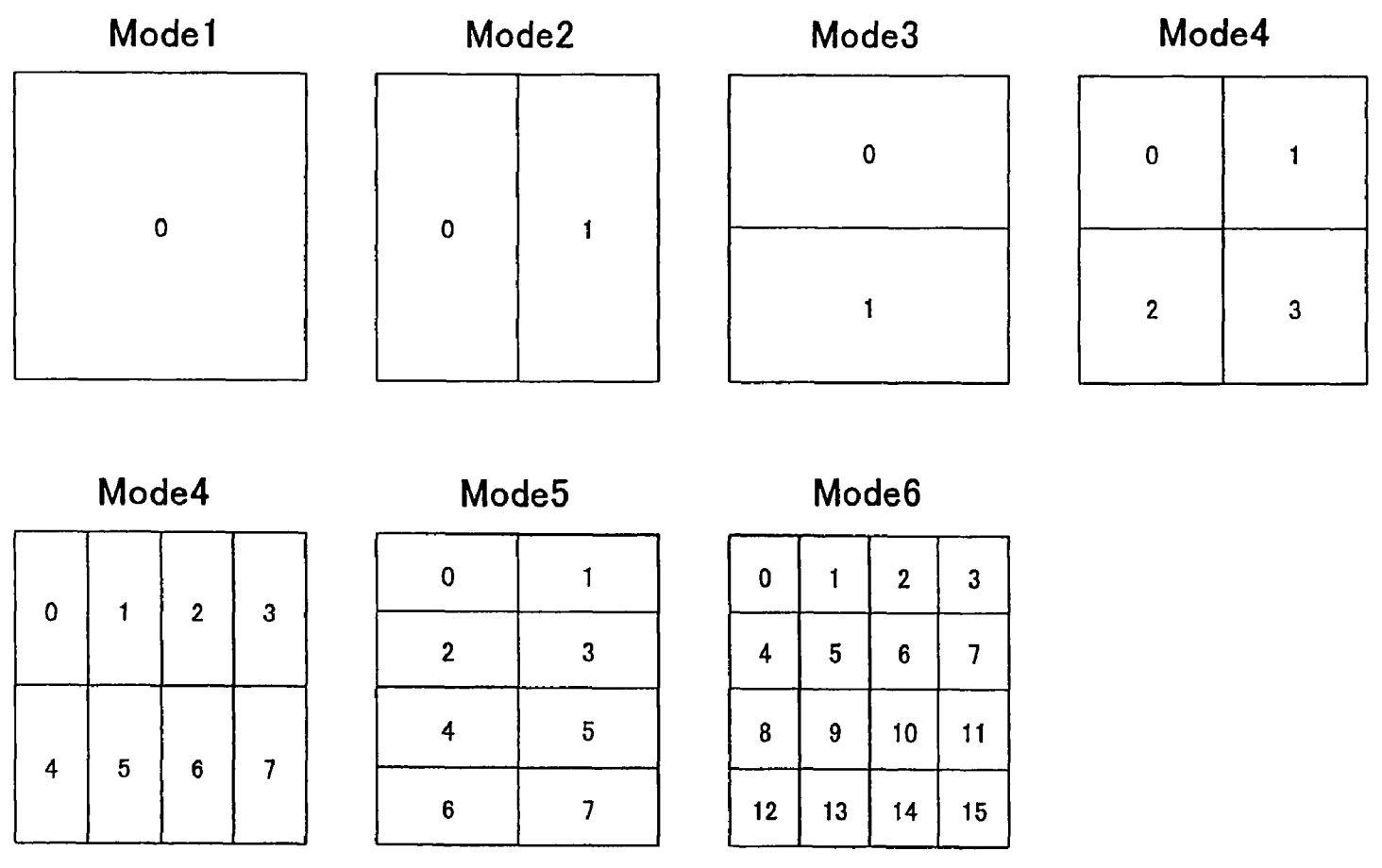

FIG. 1 is a view for explaining variable block size of motion prediction/compensation block determined at H.26L.

FIG. 4 is a view for explaining PTYPE at H.26L.

FIG. 5 is a view for explaining macro block type determined with respect to B picture at H.26L.

FIG. 6 is a view for explaining Code number of field Blk-size in bi-directional prediction mode.

BEST MODE FOR CARRYING OUT THE INVENTION

Explanation will now be given with reference to the attached drawings in connection with practical embodiments to which the present invention is applied. In this embodiment, the present invention is applied to an image information encoding apparatus adapted for changing an input image signal into blocks in accordance with, e.g., H.26L system to implement orthogonal transform thereto on the block basis to perform quantization thereof to generate image compressed information, and an image information decoding apparatus adapted for inverse-quantizing the image compressed information to implement inverse-orthogonal transform thereto to decode such image information.

In the image information encoding apparatus and the image information decoding apparatus, as described later, in motion prediction/compensation processing of interframe forward predictive encoding image (hereinafter referred to as P picture) and interframe bi-directional predictive encoding image (hereinafter referred to as B picture) where inter-encoding is performed, interpolation methods different for P picture and B picture are used, thereby making it possible to reduce operation quantity and the number of memory accesses which are required.

Figure 2:
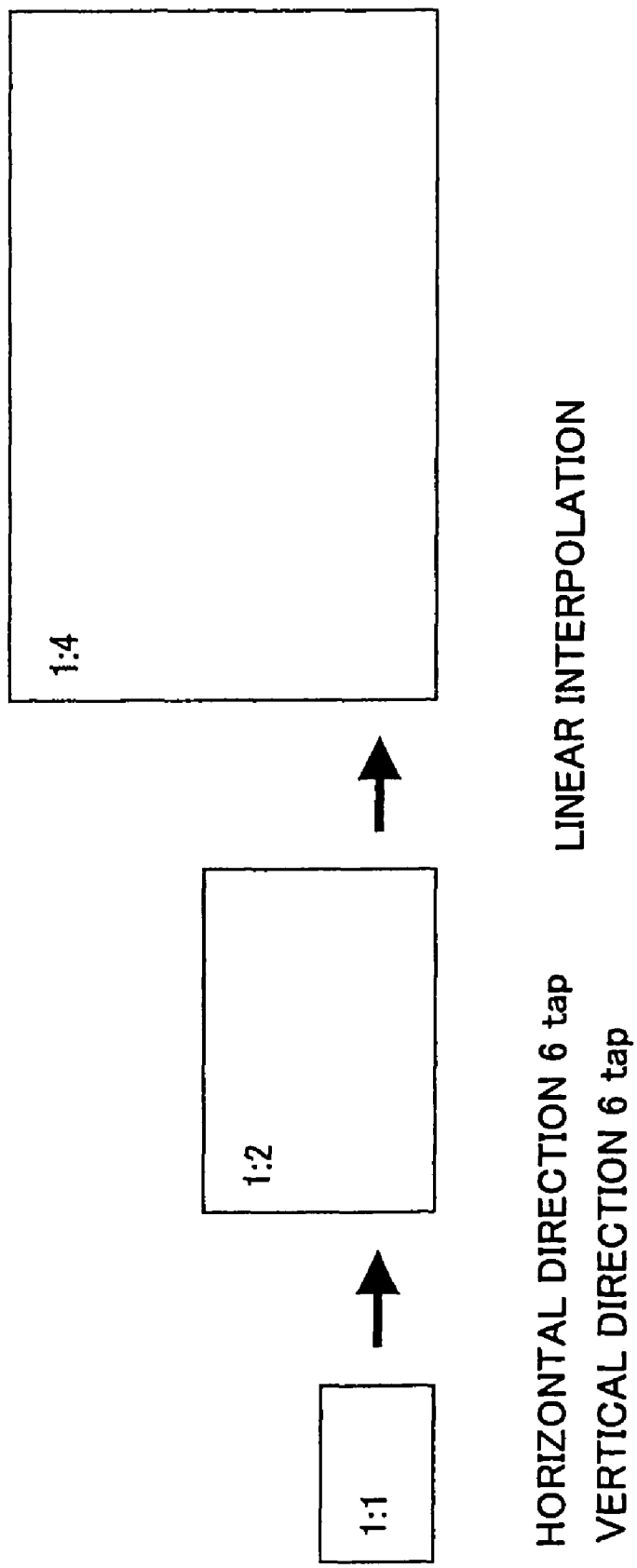
FIG. 2 is a view for explaining motion prediction/compensation processing of ¼ pixel accuracy determined at the H.26L.
Figure 3:
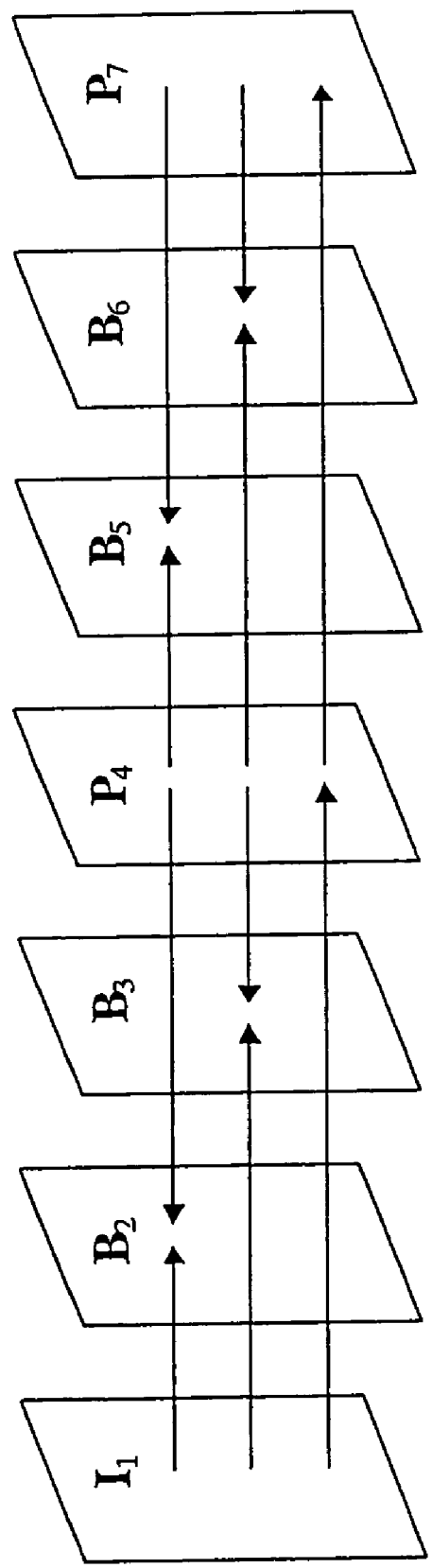
FIG. 3 is a view for explaining bi-directional prediction method using B picture at H. 26L.
Figure 7:
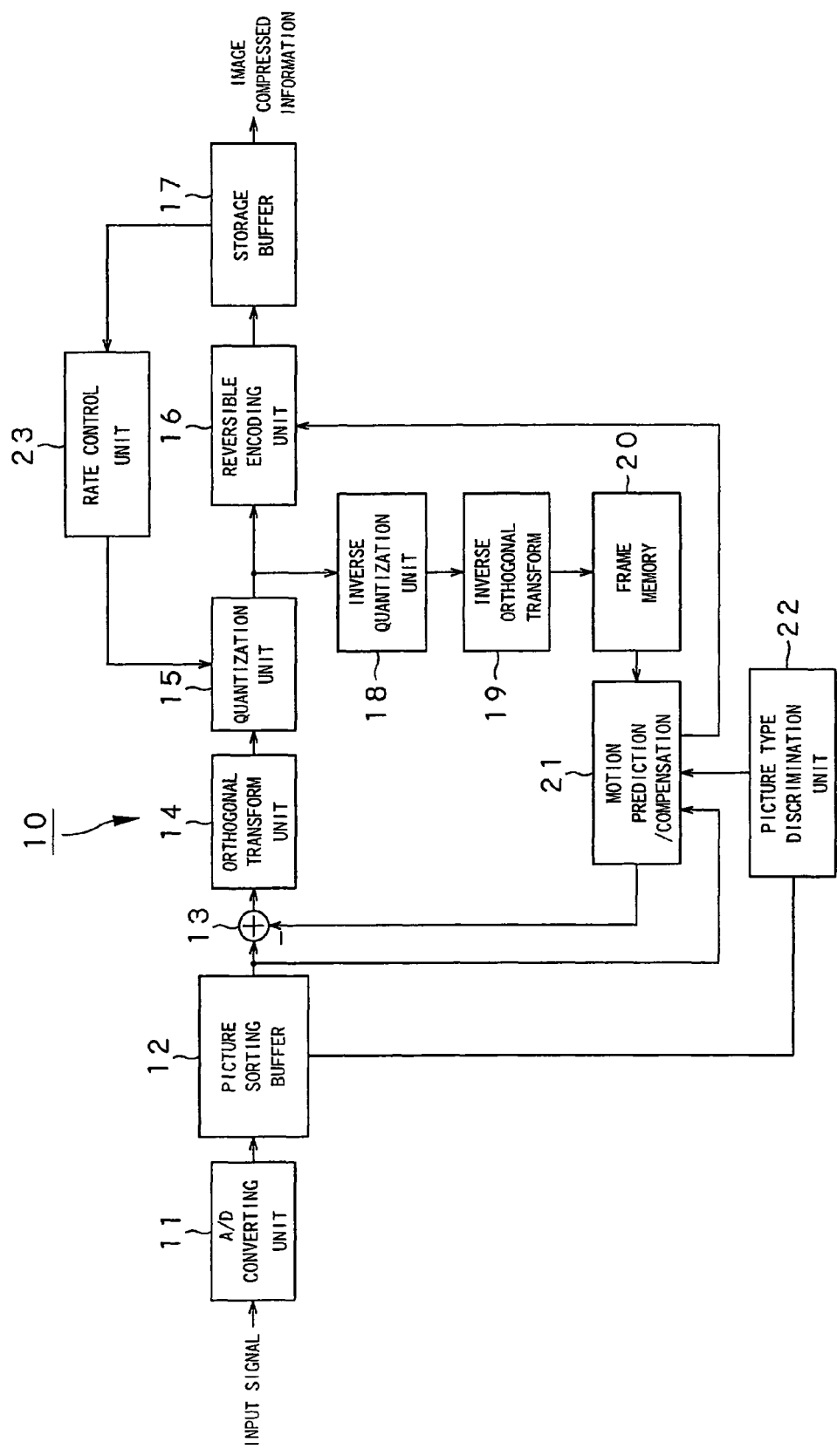
FIG. 7 is a block diagram for explaining outline of the configuration of an image information encoding apparatus in the first embodiment of the present invention.

First, outline of the configuration of the image information encoding apparatus to which the present invention is applied is shown in FIG. 7. As shown in FIG. 7, the image information encoding apparatus 10 in this embodiment comprises an A/D converting unit 11, a picture sorting buffer 12, an adder 13, an orthogonal transform unit 14, a quantization unit 15, a reversible encoding unit 16, a storage buffer 17, an inverse-quantization unit 18, an inverse-orthogonal transform unit 19, a frame memory 20, a motion prediction/compensation unit 21, a picture type discrimination unit 22, and a rate control unit 23.

In FIG. 7, the A/D converting unit 11 converts an inputted image signal into a digital signal. Further, the picture sorting buffer 12 performs sorting of frames in accordance with GOP (Group of Pictures) structure of image compressed information outputted from the image information encoding apparatus 10. Here, in regard to intraframe encoding image where intra-encoding is performed (hereinafter referred to as I picture), the picture sorting buffer 12 delivers image information of the entirety of frame to the orthogonal transform unit 14. The orthogonal transform unit 14 implements orthogonal transform such as discrete cosine transform or Karhunen-Loeve transform, etc. to image information to deliver transform coefficients to the quantization unit 15.

The quantization unit 15 implements quantization processing to the transform coefficients delivered from the orthogonal transform unit 14.

The reversible encoding unit 16 implements reversible encoding such as variable length encoding or arithmetic encoding, etc. to the quantized transform coefficients to deliver the encoded transform coefficients to the storage buffer 17 to store them thereinto. The encoded transform coefficients are outputted as image compressed information.

Behavior of the quantization unit 15 is controlled by the rate control unit 23. Moreover, the quantization unit 15 delivers quantized transform coefficients to the inverse-quantization unit 18. The inverse-quantization unit 18 inverse-quantizes those transform coefficients.

The inverse-orthogonal transform unit 19 implements inverse-orthogonal transform processing to the inverse-quantized transform coefficients to generate decoded image information to deliver the information to the frame memory 20 to store them thereinto.

On the other hand, in regard to P pictures and B pictures where inter-encoding is performed, the picture sorting buffer 12 delivers image information to the motion prediction/compensation unit 21. Moreover, the picture sorting buffer 12 delivers information of picture type of frame Picture_type to the picture type discrimination unit 22. The picture type discrimination unit 22 transmits command to the motion prediction/compensation unit 21 on the basis of that information.

At the same time, the motion prediction/compensation unit 21 takes out, from the frame memory 20, image information which is referred to implement motion prediction/compensation processing by using interpolation methods different in P picture and B picture as described later on the basis of the command transmitted from the picture type discrimination unit 22 to generate reference image information.

The motion prediction/compensation unit 21 delivers this reference image information to the adder 13. The adder 13 converts the reference image information into difference signal between the reference image information and the image information. Moreover, at the same time, the motion compensation/prediction unit 21 delivers motion vector information to the reversible encoding unit 16.

The reversible encoding unit 16 implements reversible encoding processing such as variable length encoding or arithmetic encoding, etc. to that motion vector information to form information to be inserted into header portion of image compressed information. It should be noted that since other processing are similar to processing in the case of image compressed information to which intra-encoding is implemented, their explanation will be omitted.

Figure 8:
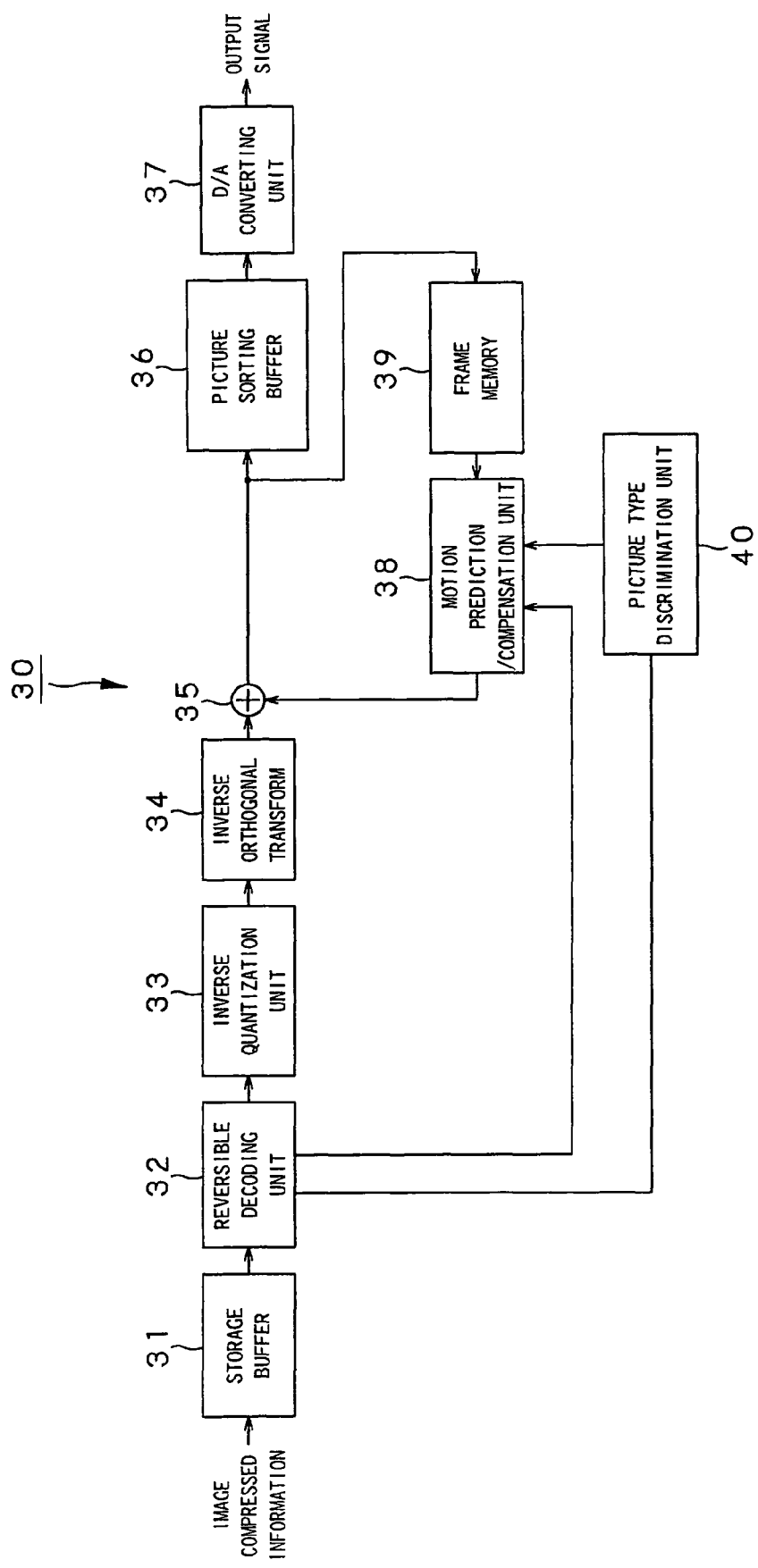
FIG. 8 is a block diagram for explaining outline of the configuration of an image information decoding apparatus in thr first embodiment of the present invention.

Then, outline of the configuration of the image information decoding apparatus to which the present invention is applied is shown in FIG. 8. As shown in FIG. 8, the image information decoding apparatus 30 in this embodiment comprises a storage buffer 31, a reversible decoding unit 32, an inverse-quantization unit 33, an inverse-orthogonal transform unit 34, an adder 35, a picture sorting buffer 36, a D/A converting unit 37, a motion prediction/compensation unit 38, a frame memory 39, and a picture type discrimination unit 40.

In FIG. 8, the storage buffer 31 temporarily stores inputted image compressed information thereafter to transfer it to the reversible decoding unit 32.

The reversible decoding unit 32 implements processing such as variable length decoding or arithmetic decoding, etc. to image compressed information on the basis of determined format of image compressed information to deliver quantized transform coefficients to the inverse-quantization unit 33. In the case where corresponding frame is P picture or B picture, the reversible decoding unit 32 also decodes motion vector information stored in the header portion of image compressed information to deliver the information thereof to the motion prediction/compensation unit 38. Further, the reversible decoding unit 32 delivers information of picture type of frame Picture_type to the picture discrimination unit 40. The picture type discrimination unit 40 transmits command to the motion prediction/compensation unit 38 on the basis of that information.

The inverse-quantization unit 33 inverse-quantizes the quantized transform coefficients delivered from the reversible decoding unit 32 to deliver transform coefficients to the inverse-orthogonal transform unit 34. The inverse-orthogonal transform unit 34 implements inverse-orthogonal transform such as inverse discrete cosine transform or inverse Karhunen-Loeve transform, etc. to the transform coefficients on the basis of the determined format of image compressed information.

Here, in the case where corresponding picture is I picture, the inverse-orthogonal transform unit 34 delivers inverse-orthogonally transformed image information to the picture sorting buffer 36. The picture sorting buffer 36 temporarily stores this image information thereafter to deliver it to the D/A converting unit 37. The D/A converting unit 37 implements D/A converting processing to the image information to output it.

On the other hand, in the case where corresponding frame is P picture or B picture, the motion prediction/compensation unit 38 takes out, from the frame memory 39, image information to be referred to implement motion prediction/compensation processing by using interpolation methods different for P picture and B picture as described later on the basis of reversibly decoded motion vector information and command transmitted from the picture type discrimination unit 40 to generate reference image information. The adder 35 synthesizes this reference image and output from the inverse-orthogonal transform unit 34. It should be noted that since other processing are similar to processing of intra-encoded frame, its detailed explanation will be omitted.

As described above, the image information encoding apparatus 10 and the image information decoding apparatus 30 according to the present invention perform motion prediction/compensation processing by using interpolation methods different in P picture and B picture at motion prediction/compression units 21, 38 on the basis of commands transmitted from the picture type discrimination units 22, 40 to thereby reduce operation quantity and the number of memory accesses which are required.

In view of the above, while motion prediction/compensation at the motion prediction/compensation units 21, 38 will be explained below, since similar processing are performed at the motion prediction/compensation unit 21 and the motion prediction/compensation unit 38, only the processing at the motion prediction/compensation unit 21 will be explained below.

At the motion prediction/compensation unit 21, there are stored information relating to two filter coefficients for P picture and B picture. The motion prediction/compensation unit 21 implements different motion prediction/compensation processing to P picture and B picture by the first method or the second method indicated below.

First, in the first method, motion prediction/compensation processing of the same pixel accuracy is implemented to P picture and B picture. In this case, as compared to P picture, filter having lesser number of taps is used for B picture.

In concrete terms, in the case where motion prediction/compensation processing of $\frac{1}{8}$ pixel accuracy are performed with respect to both P picture and B picture, filter coefficients of 8 taps shown in the following formula (3) are used in regard to P picture, and predictive picture of $\frac{1}{8}$ pixel accuracy is generated by linear interpolation in regard to B picture.

$$1:1 \quad (3)$$
$$1/8: \{-3, 12, -37, 485, 71, -21, 6, -1\}/512$$
$$2/8: \{-3, 12, -37, 229, 71, -21, 6, -1\}/256$$
$$3/8: \{-6, 24, -76, 387, 229, -60, 18, -4\}/512$$
$$4/8: \{-3, 12, -39, 158, 158, -39, 12, -3\}/256$$
$$5/8: \{-4, 18, -60, 229, 387, -76, 24, -6\}/512$$
$$6/8: \{-1, 6, -21, 71, 229, -37, 12, -3\}/256$$
$$7/8: \{-1, 6, -21, 71, 485, -37, 12, -3\}/512$$

Moreover, in the case where motion prediction/compensation processing of ¼ pixel accuracy is performed with respect to both P picture and B picture, filter coefficients of 8 taps as shown in the following formula (4) are used with respect to respective phases in regard to P picture to generate predictive picture of ¼ pixel accuracy. On the other hand, in regard to B picture, filter coefficients of 6 taps shown in the following formula (5) are used to generate predictive picture of ½ pixel accuracy, and predictive picture of ¼ pixel accuracy is generated by linear interpolation.

$$\begin{aligned}
1/4: &\{-3, 12, -37, 229, 71, -21, 6, -1\}/256 \\
2/4: &\{-3, 12, -39, 158, 158, -39, 12, -3\}/256 \\
3/4: &\{-1, 6, -21, 71, 229, -37, 12, -3\}/256
\end{aligned} \quad (4)$$

$$\{1, -5, 20, 20, -5, 1\}/32 \quad (5)$$

It is to be noted that, in regard to B picture, predictive picture of ¼ pixel accuracy may be generated by linear interpolation to perform motion prediction/compensation processing.

Moreover, in regard to P picture, filter coefficients of 6 taps show in the formula (5) may be used to generate predictive pixel of ½ pixel accuracy thereafter to generate predictive picture of ¼ pixel accuracy by linear interpolation. In regard to B picture, predictive picture of ¼ pixel accuracy may be generated by linear interpolation to perform motion prediction/compensation processing.

Then, in the second method, there is performed motion prediction/compensation processing having higher accuracy with respect to P picture as compared to B picture.

In concrete terms, in regard to P picture, filter coefficients of 8 taps shown in the above-described formula (3) are used to generate predictive picture of ⅛ pixel accuracy to perform motion prediction/compensation processing. On the other hand, in regard to B picture, filter coefficients of 6 taps shown in the above-described formula (5) are used to generate predictive picture of ½ pixel accuracy to generate predictive picture of ¼ pixel accuracy by linear interpolation to perform motion prediction/compensation processing. It is to be noted that, in regard to B picture, predictive picture of ¼ pixel accuracy may be generated, or predictive picture of ½ pixel accuracy mat be generated by linear interpolation to perform motion prediction/compensation processing.

Moreover, in regard to P picture, filter coefficients of 6 taps shown in the formula (5) may be used to generate predictive picture of ½ pixel accuracy thereafter to generate predictive picture of ¼ pixel accuracy by linear interpolation. In regard to B picture, predictive picture of ½ pixel accuracy may be generated by linear interpolation to perform motion prediction/compensation processing.

Figure 9:
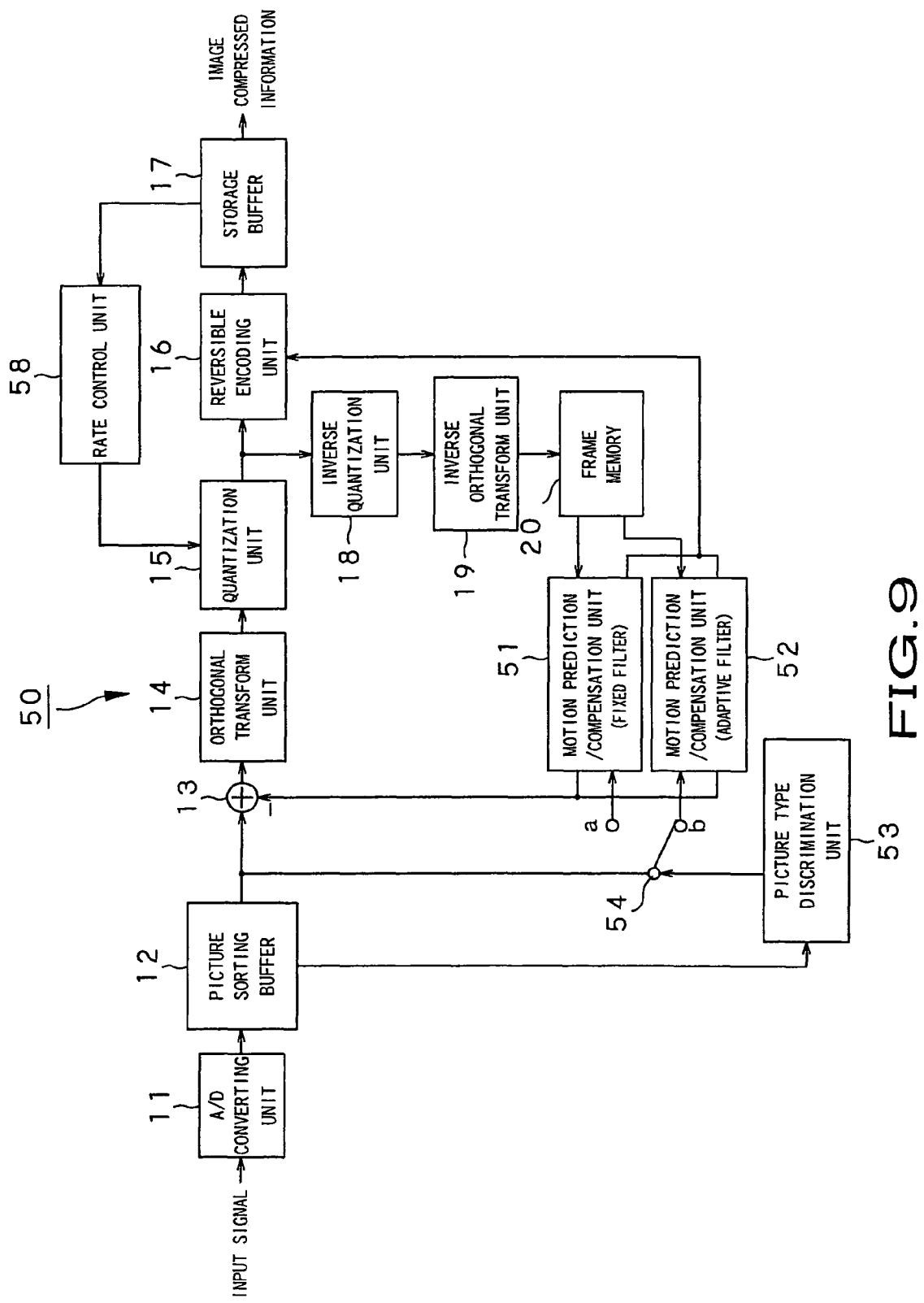
FIG. 9 is a block diagram for explaining outline of the configuration of an image information encoding apparatus in the second embodiment of the present invention.

Then, another example of the image information encoding apparatus 50 according to the present invention is shown in FIG. 9. The image information encoding apparatus 50 shown in FIG. 9 has the fundamental configuration similar to the image information encoding apparatus 10 shown in FIG. 7. In this example, the image information encoding apparatus 50 is characterized in that it includes a motion prediction/compensation unit (fixed filter) 51, and a motion prediction/compensation unit (adaptive filter) 52, wherein use of any one of filters is switched by a switching unit 54 in accordance with command from a picture type discrimination unit 53. Namely, the image information encoding apparatus 50 includes, as components thereof, a single motion prediction/compensation unit 21 like the image information encoding apparatus 10 in the above-described first embodiment, and includes, as components thereof, two components of motion prediction/compensation unit (fixed filter) 51 as prescribed at present in the H.26L, and motion prediction/compensation unit (adaptive filter) 52 as proposed in the previously described literature 1 without having filter coefficients for P picture and B picture therewithin, whereby any one of filters is used in dependency upon P picture or B picture.

Figure 10:
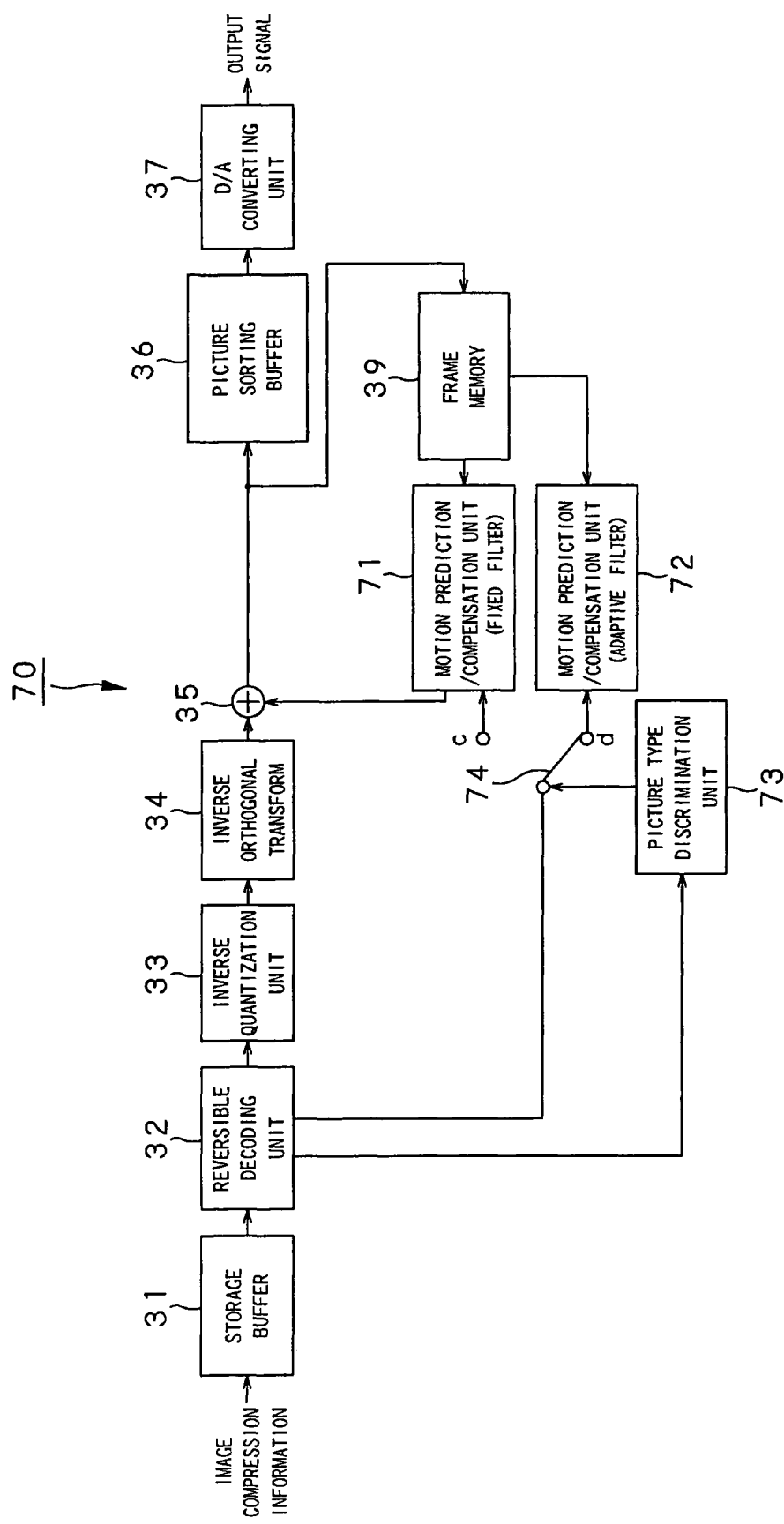
FIG. 10 is a block diagram for explaining outline of the configuration of an image information decoding apparatus in the second embodiment according to the present invention.

Moreover, image information decoding apparatus 70 shown in FIG. 10 has the fundamental configuration similar to the image information decoding apparatus 30 shown in FIG. 8, and is characterized in that it includes a motion prediction/compensation unit (fixed filter) 71, and a motion prediction/compensation unit (adaptive filter) 72, wherein whether or not either one of these filters is used is switched by a picture discrimination unit 73 in accordance with command from a picture discrimination unit 73.

Accordingly, since the same reference numeral are respectively attached to the configurations similar to those of the image information encoding apparatus and the image information decoding apparatus 30 previously shown in FIGS. 7 and 8, their explanation will be omitted.

In the image information encoding apparatus 50 shown in FIG. 9, picture sorting buffer 12 delivers information of picture type of frame Picture_type to picture type discrimination unit 53. The picture type discrimination unit 53 transmits command to the switching unit 54 on the basis of that information.

Namely, in the case where corresponding frame is B picture, the switching unit 54 is switched to the side of a in the figure by the above-described command. Thus, motion prediction/compensation processing by the fixed filter is performed by using motion prediction/compensation unit (fixed filter) 51.

On the other hand, in the case where corresponding frame is P picture, the switching unit 54 is switched to the side of b in the figure by the above-described command. Thus, motion prediction/compensation processing by the adaptive filter is performed by using the motion prediction/compensation unit (adaptive filter). In more detail, initially, as the first step, motion vector d(k) which minimizes predictive error is determined by using filter determined in advance. Subsequently, as the second step, such filter coefficients H(k) to minimize predictive error are determined with respect to motion vector d(k) determined at the first step. Further, motion compensation processing is performed by the filter coefficients H(k) and the motion vector d(k) which have been determined in this way. Information relating to the filter coefficients are transmitted in the state embedded in image compressed information. In this instance, variable length encoding processing or arithmetic encoding processing may be implemented at the reversible encoding unit 16 to compress information quantity thereafter to embed such information into image compressed information.

It is to be noted that pixel accuracy in motion prediction/compression processing at the motion prediction/compensation unit (fixed filter) 51 or motion prediction/compensation unit (adaptive filter) 52 of P picture and that of B picture may be equal to each other, and motion prediction/compression processing of higher pixel accuracy may be performed with respect to P picture as compared to B picture. Transmission of information of pixel accuracy is performed in the state embedded in MotionResolution field at RIP (Real-time Transfer Protocol) layer within image compressed information to be outputted.

In the image information decoding apparatus 70 shown in FIG. 10, reversible decoding unit 32 delivers information of picture type of frame Picture_Type to picture type discrimination unit 73. The picture type discrimination unit 73 transmits command to switching unit 74 on the basis of that information.

Namely, in the case where corresponding frame is B picture, the switching unit 74 is switched to the side of c in the figure by the above-described command. Thus, predictive mode information and motion vector information are delivered the motion prediction/compensation unit (fixed filter) 71. As a result, motion prediction/compensation processing by fixed filter is performed on the basis of these information.

On the other hand, in the case where corresponding frame is P picture, the switching unit 74 is switched to the side of d in the figure by the above-described command. Thus, information relating to filter coefficients is delivered to motion prediction/compensation unit (adaptive filter) 72 along with predictive mode information and motion vector information. As a result, motion prediction/compensation processing by the adaptive filter is performed on the basis of these information.

In this example, at the motion prediction/compensation unit (fixed filter) 71 or the motion prediction/compensation unit (adaptive filter) 72, motion prediction/compression processing is performed on the basis of pixel accuracy embedded in MotionResolution field at RTP layer within image compressed information.

As explained above by using the first and second embodiments, motion prediction/compression processing based on different interpolation methods are performed with respect to P picture and B picture, thereby making it possible to reduce operation quantity and the number of memory accesses at B picture for which a larger operation quantity and the number of memory accesses are required as compared to P picture while suppressing deterioration in picture quality as minimum as possible.

It should be noted that the present invention is not limited only to the above-described embodiments, it is a matter of course that various changes or modifications may be made within the range which does not depart from the gist of the present invention.

For example, while the present invention has been explained as the configuration of hardware in the above-described embodiments, the present invention may be also realized, without being limited to such implementations, by allowing CPU (Central Processing Unit) to respectively execute processing at image information encoding apparatuses 10, 50 and image information decoding apparatuses 30, 70.

It is to be noted that the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth by appended claims.

INDUSTRIAL APPLICABILITY

As described above, in accordance with the image information encoding apparatus and the image information encoding method according to the present invention, picture type of input image signal is discriminated to perform, with respect to interframe bi-directional predictive encoding image, motion prediction/compensation processing based on interpolation method in which operation quantity and the number of memory accesses are reduced to more degree as compared to interframe forward predictive encoding image, thereby making it possible to reduce operation quantity and the number of memory accesses in motion prediction/compensation processing.

Moreover, the program according to the present invention is used to thereby allow computer to discriminate picture type of input image signal to perform motion prediction/compensation processing based on interpolation method in which operation quantity and the number of memory accesses are reduced to more degree as compared to interframe forward predictive encoding picture with respect to interframe bi-directional predictive encoding image, thereby making it possible to reduce operation quantity and the number of memory accesses in motion prediction/compensation processing.

In accordance with the image information decoding apparatus and the image information decoding method according to the present invention, picture type of image compressed information generated at the image information encoding apparatus is discriminated to perform motion prediction/compensation processing based on interpolation method in which operation quantity and the number of memory accesses are reduced to more degree as compared to interframe forward predictive encoding image with respect to interframe bi-directional predictive encoding image, thereby making it possible to reduce operation quantity and the number of memory accesses in motion prediction/compensation processing.

Further, another program according to the present invention is used to thereby allow computer to discriminate picture type of image compressed information generated at the image information encoding apparatus to perform motion prediction/compensation processing based on interpolation method in which operation quantity and the number of memory accesses are reduced to more degree as compared to interframe forward predictive encoding image with respect to interframe bi-directional predictive encoding image, thereby making it possible to reduce operation quantity and the number of memory accesses in motion prediction/compensation processing.

The invention claimed is:

1. An image information encoding apparatus adapted for encoding an input image signal at least including intraframe encoding image, interframe forward predictive encoding image and interframe bi-directional predictive encoding image by orthogonal transform and motion prediction and/or compensation processing to generate image compressed information, the image information encoding apparatus comprising:

a motion prediction and/or compensation unit configured to perform motion prediction and/or compensation processing based on different interpolation methods with respect to the interframe forward predictive encoding image and the interframe bi-directional predictive encoding image, wherein the motion prediction and/or compensation unit includes a first filter and performs motion prediction and/or compensation processing by using the first filter with respect to the interframe forward predictive encoding image, and includes a second filter and performs motion prediction and/or compensation processing by using the second filter, the second filter having a fewer number of taps relative to the first filter with respect to the interframe bi-directional predictive encoding image, the motion prediction and/or compensation unit being configured to perform motion prediction and/or compensation of ¼ pixel accuracy, and to perform, with respect to the interframe forward predictive encoding image, interpolation processing of ½ pixel accuracy by using filter coefficients having 6 taps {1, −5, 20, 20, −5, 1}/32 to perform interpolation processing of ¼ pixel accuracy by linear interpolation in accordance with generated pixels.

2. The image information encoding apparatus as set forth in claim 1,
wherein the motion prediction and/or compensation unit is configured to select, as an interpolation method with respect to the interframe bi-directional predictive encoding image, a method in which operation quantity and a number of memory accesses are reduced to a greater degree as compared to the interframe forward predictive encoding image.

3. The image information encoding apparatus as set forth in claim 1,
wherein the motion prediction and/or compensation unit is configured to have a same pixel accuracy of motion prediction and/or compensation processing for the interframe forward predictive encoding image and the interframe bi-directional predictive encoding image.

4. The image information encoding apparatus as set forth in claim 1,
wherein the motion prediction and/or compensation unit is configured to select motion prediction/compensation processing by different pixel accuracies for the interframe forward predictive encoding image and the interframe bi-directional predictive encoding image.

5. The image information encoding apparatus as set forth in claim 4,
wherein the motion prediction and/or compensation unit is configured to perform motion prediction and/or compensation processing of ¼ pixel accuracy with respect to the interframe forward predictive encoding image, and to perform motion prediction and/or compensation processing of ½ pixel accuracy with respect to the interframe bi-directional predictive encoding image.

6. The image information encoding apparatus as set forth in claim 4,
wherein information relating to pixel accuracy of motion prediction and/or compensation processing are respectively embedded in a MotionResolution field at RTP layer within the image compressed information with respect to the interframe forward predictive encoding image and the interframe bi-directional predictive encoding image.

7. The image information encoding apparatus as set forth in claim 1,
wherein the motion prediction and/or compensation unit is configured to perform motion prediction and/or compensation processing of ¼ pixel accuracy by linear interpolation with respect to the interframe bi-directional predictive encoding image.

8. An image information encoding method for encoding an input image signal at least including intraframe encoding image, interframe forward predictive encoding image and interframe bi-directional predictive encoding image by orthogonal transform and motion prediction and/or compensation processing to generate image compressed information, the image information encoding method including:

performing motion prediction and/or compensation processing, using an image information encoding apparatus, based on different interpolation methods with respect to the interframe forward predictive encoding image and the interframe bi-directional predictive encoding image, wherein the performing motion prediction and/or compensation processing comprises performing motion prediction and/or compensation processing by using a first digital filter with respect to the interframe forward predictive encoding image, and performing motion prediction and/or compensation processing by using a second digital filter having a fewer number of taps relative to the first filter with respect to the interframe bi-directional predictive encoding image, the performing motion prediction and/or compensation processing including performing motion prediction and/or compensation of ¼ pixel accuracy, and performing, with respect to the interframe forward predictive encoding image, interpolation processing of ½ pixel accuracy by using filter coefficients having 6 taps {1, −5, 20, 20, −5, 1}/32 to perform interpolation processing of ¼ pixel accuracy by linear interpolation in accordance with generated pixels.

9. The image information encoding method according to claim 8, further comprising:
selecting, as an interpolation method with respect to the interframe bi-directional predictive encoding image, a method in which operation quantity and a number of memory accesses are reduced to a greater degree as compared to the interframe forward predictive encoding image.

10. The image information encoding method according to claim 8, wherein the performing motion prediction and/or compensation processing includes having a same pixel accuracy of motion prediction and/or compensation processing for the interframe forward predictive encoding image and the interframe bi-directional predictive encoding image.

11. The image information encoding method according to claim 8, wherein the performing motion prediction and/or compensation processing includes having different pixel accuracies of motion prediction and/or compensation processing for the interframe forward predictive encoding image and the interframe bi-directional predictive encoding image.

12. The image information encoding method according to claim 8, wherein the performing motion prediction and/or compensation processing includes performing motion prediction and/or compensation processing of ¼ pixel accuracy by linear interpolation with respect to the interframe bi-directional predictive encoding image.

13. A computer-readable storage medium having embedded therein instructions, which when executed by a processor, cause the processor to perform processing which encodes an input image signal at least including intraframe encoding image, interframe forward predictive encoding image and interframe bi-directional predictive encoding image by orthogonal transform and motion prediction and/or compensation processing to generate image compressed information, the processing including:

performing motion prediction and/or compensation processing based on different interpolation methods with respect to the interframe forward predictive encoding image and the interframe bi-directional predictive image,
wherein the performing motion prediction and/or compensation processing comprises performing motion prediction and/or compensation processing by using a first filter with respect to the interframe forward predictive encoding image, and performing motion prediction and/or compensation processing by using a second filter having a fewer number of taps relative to the first filter with respect to the interframe bi-directional predictive encoding image, the performing motion prediction and/or compensation processing including performing motion prediction and/or compensation of ¼ pixel accuracy, and performing, with respect to the interframe forward predictive encoding image, interpolation processing of ½ pixel accuracy by using filter coefficients having 6 taps {1, −5, 20, 20, −5, 1}/32 to perform interpolation processing of ¼ pixel accuracy by linear interpolation in accordance with generated pixels.

14. The computer-readable storage medium according to claim 13, further comprising:
selecting, as an interpolation method with respect to the interframe bi-directional predictive encoding image, a method in which operation quantity and a number of memory accesses are reduced to a greater degree as compared to the interframe forward predictive encoding image.

15. The computer-readable storage medium according to claim 13, wherein the performing motion prediction and/or compensation processing includes having a same pixel accuracy of motion prediction and/or compensation processing for the interframe forward predictive encoding image and the interframe bi-directional predictive encoding image.

16. The computer-readable storage medium according to claim 13, wherein the performing motion prediction and/or compensation processing includes having different pixel accuracies of motion prediction and/or compensation processing for the interframe forward predictive encoding image and the interframe bi-directional predictive encoding image.

17. The computer-readable storage medium according to claim 13, wherein the performing motion prediction and/or compensation processing includes performing motion prediction and/or compensation processing of ¼ pixel accuracy by linear interpolation with respect to the interframe bi-directional predictive encoding image.

* * * * *